March 24, 1970 G. H. WRETMAN ET AL 3,502,395
ADJUSTABLE HOLDER
Filed Jan. 16, 1968
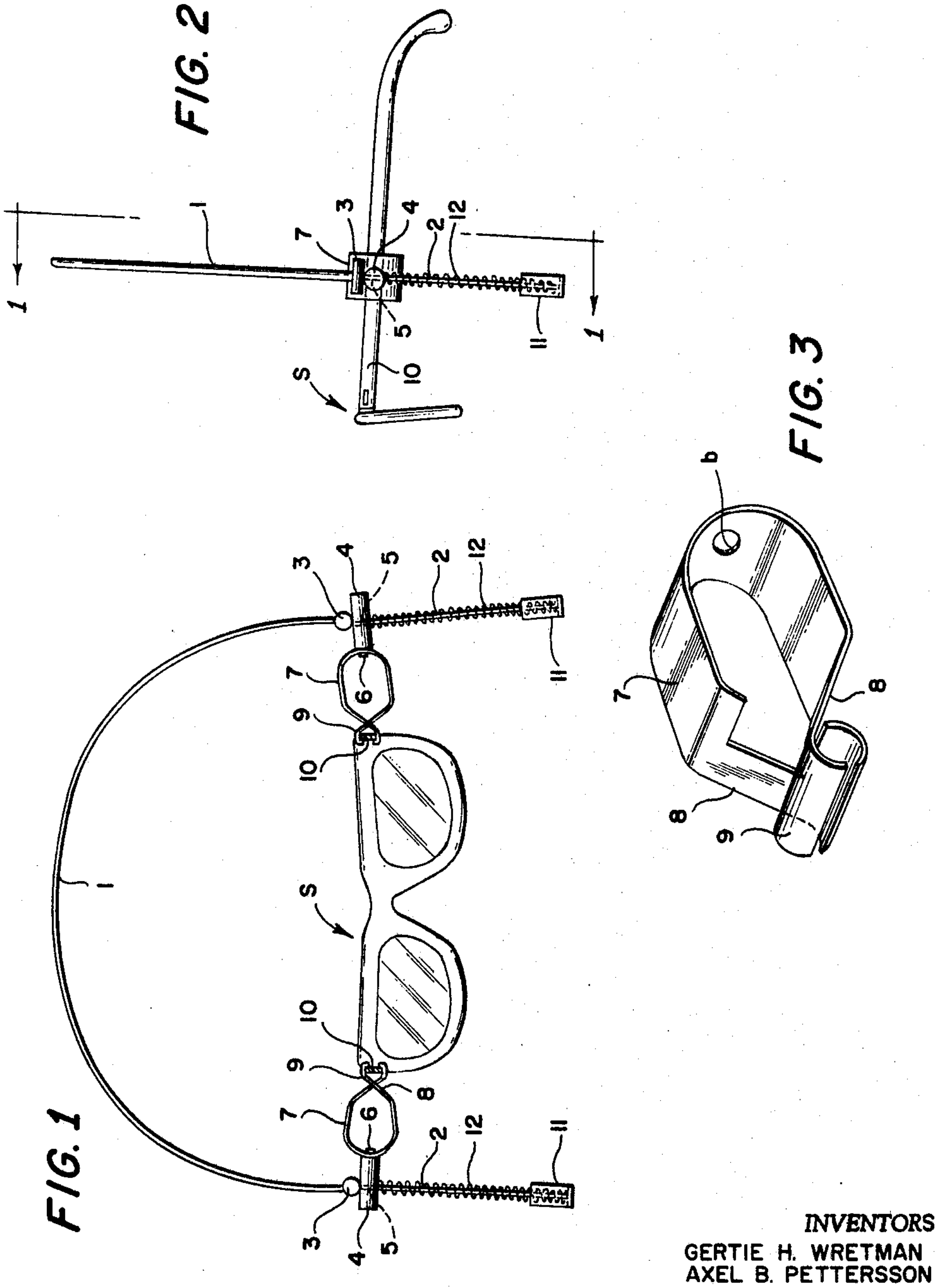
INVENTORS
GERTIE H. WRETMAN
AXEL B. PETTERSSON
BY Larson and Taylor
ATTORNEYS

United States Patent Office 3,502,395

Patented Mar. 24, 1970

3,502,395

ADJUSTABLE HOLDER

Gertie Henrietta Wretman, Gyllenstiernsgatan 4, Stockholm, and Axel Borje Pettersson, Gubbkarrsbacken 25, Bromma, both of Sweden Filed Jan. 16, 1968, Ser. No. 698,187
Claims priority, application Sweden, Jan. 17, 1967, 647/67
Int. Cl. G02c *3/00*
U.S. Cl. 351—156 7 Claims

ABSTRACT OF THE DISCLOSURE

An adjustable holder or support device for spectacles for use when the spectacles cannot be normally supported by the ears. The device includes an arched frame fitting over the head of the wearer and including a pair of rod-like end portions. Adjusting members pivotably mounted on the end portions include gripping claws for gripping the templates of the spectacles. Coil springs surrounding the rod-like frame portions and compressed between the adjusting members and end stops formed on the rod-like frame portions, when released, to cause the frame to engage the head of a wearer.

FIELD OF THE INVENTION

The present invention relates to an adjustable holder or supporting means for spectacles or like devices and more particularly to holding means for spectacles under conditions where the spectacles cannot be normally supported as where the head of the wearer is bandaged or where the hair is being waved by means of rollers or the like.

BACKGROUND OF THE INVENTION AND THE PRIOR ART

Under conditions like those described above it may be impossible for the wearer of glasses to place the bows or templates of his spectacles behind the ears in the normal manner. For example, where a woman's hair is put up in rollers and covered with a cap for drying, spectacles cannot be supported in the normal manner and thus reading, which is the customary pasttime for women while waiting for their hair to dry, is made difficult or impossible for a woman who wears spectacles. Auxiliary devices for holding spectacles are known but none are known which provides satisfactory support under the circumstances described.

BRIEF SUMMARY OF THE INVENTION

The present invention provides an adjustable holder with means to be fitted over the head of a wearer to support spectacles in a position for reading. In accordance with one features of the present invention means for gripping and supporting spectacles or eye glasses of any standard type is provided.

In accordance with a presently preferred embodiment of the invention the holder includes an arched frame fitting over the head of the wearer and including a pair of elongate end portions. Adjusting members pivotably mounted on the end portions include gripping claws for gripping the templates of the spectacles. Spring members are mounted between the adjusting members and end stops on the ends of the elongate portions. In use, the gripping members are attached to the templates of the spectacles, the springs are compressed by movement of the adjusting members towards the end stops and the frame is fitted over the head so that the templates assume a suitable position adjacent or below the ear of the wearer. The springs are then released and, acting between the adjusting members, which being attached to the templates are relatively fixed in position, and the end stops, the springs cause downward movement of the frame so that the head of the wearer is engaged. In accordance with a further feature of the present invention the adjusting members are automatically urged into final position by coil springs which bear against end stops at the ends of the elongate end portions.

BRIEF DESCRIPTION OF THE DRAWINGS

Other objects and advantages of the present invention will become apparent upon considertion of the following description of a presently preferred embodiment of the invention as shown in the drawings wherein:

FIGURE 1 is a rear view of an adjustable holder in accordance with the invention shown supporting a pair of glasses or spectacles, taken generally along line 1—1 of FIGURE 2, FIGURE 2 is a side view of the embodiment of FIGURE 1, and FIGURE 3 is an enlarged perspective view of the spring clamp member of FIGURES 1 and 2.

DESCRIPTION OF THE PREFERRED EMBODIMENT

Referring to FIGURES 1 and 2, the adjustable holder in accordance with the invention includes an arched or U-shaped frame 1 of a light flexible material such as a suitable plastic. Frame 1 is of sufficient size to fit over and be spaced from a head provided with hair rollers or bandaging as described hereinbefore. The two end portions of frame 1 are each fixedly secured to a short projecting member or pin 3 which is adapted to be gripped by the fingers. A pair of elongate rod-like members 2 are fixedly secured to and depend from pins 3. As is shown in FIGURES 1 and 2 rod members 2 extend downwardly as a continuation of and in alignment with the lower portions of arched frame 1.

The holder further includes an adjusting member 4 of generally cylindrical shape which includes a transverse bore hole 5 therethrough. Bore hole 5 is of such a size as to permit both pivotable and longitudinal movement of adjusting members 4 along rod members 6. Each adjusting member 4 further includes a stud 6 which mounts a spring clamp 7. Stud 6 extends through a bore hole denoted *b* in clamp 7 to permit pivoting of the entire frame assembly about the axis of stud 6. The size of the bore hole *b* in clamp 7 is such as to permit limited pivoting or rocking movement of clamp 7.

As can best be seen in FIGURE 3 spring clamp 7 is constructed of a flat strip of material such as metal and includes crisscrossing portions 8 which terminate in gripping claws 9 for gripping the templates or bows 10 of a pair of glasses or spectacles, generally denoted S, as shown in FIGURES 1 and 2. The gripping claws 9 include rounded inner surfaces which permit a limited pivoting movement of the templates 10 within the claws 9.

Rod members 2 are provided with end stops 11 which serve a dual function. End stops 11 are of hollow cylindrical construction and each include a lower base member fixedly attached to the end of a corresponding rod member 2. Stops 11 serve both as a stop shoulder for limiting the travel of adjusting members 4 as well as a casing for helical springs 12. Helical springs 12 are located on and surround each rod member 2 and each abuts against the lower surface of an adjusting member 4 and against the base of an end stop 11. Thus adjusting members 4 are displaceable along the length of rod members 2 against the biasing action of springs 12 from an upper position, determined by the location of projecting pins 3, and a lower position, determined by the location of end stops 11. With adjusting members 4 abutting end stop 11 the springs 12 are in their completely compressed state.

The holding device of the present invention is used as described hereinafter. Firstly, the portions of spring clamps 7 forming an oval are squeezed together to open the gripping claws 9 so that the spectacle templates may be gripped as shown in FIGURE 1. In the next step, the thumbs are used to support end stops 11 while the forefingers grip the outwardly extending portions of adjusting members 4 The general shape of adjusting members 4 and particularly the fact that a portion thereof extends outwardly of the longitudinal axis of rod members 2 permit easy gripping of the adjusting members with the forefingers. The adjusting members 4 are forced downwardly by the forefingers against the biassing action of coil springs 12 to a position adjacent end stops 11. Wtih the adjusting members 4 adjacent the end stops 11 the area enclosed by the frame assembly is greatly increased to provide easy fitting of the assembly over the head. The arched frame 1 is pivoted about the axis of stud 6 and is held at a suitable angle, for example, an angle of approximately 90° to the templates 10, and the entire holding assembly together with the spectacles S is fitted over the head until the spectacles S rest on the bridge of the nose of the wearer and the templates rest beside or below the ears. Adjusting members 4 are then released and the springs 12, acting between the relatively fixed points provided by adjusting members 4 and end stops 11, cause downward movement of bow 1 and rod members 2 so that bow 1 engages the head of the wearer.

It is noted that at the end of the movement of rod members 2 springs 12 will force the adjusting members 4 into a slightly inclined relationship with rod members 2, each of gripping claws 9 providing a fixed point about which a corresponding adjusting member 4 may pivot. This inclination is permitted by the fact that the diameters of the holes 5 in adjusting members 4 are sufficiently larger than the diameters of rods 2 as to permit some small play therebetween. Further as described hereinbefore limited pivoting movement of spring clamps 7 with respect to the mounting stubs 6 is also possible. The inclined position of adjusting members 4 provides a "locking" engagement of adjusting members 4 with rod members 2. When bow member 1 reaches the rest position thereof the spectacles are in place although because of the various limited movements described hereinbefore fine adjustment of the position of the spectacles may still be effected. The particular steps in fitting the holder into position are merely illustrative and it will, of course, be appreciated that the sequence thereof may be varied.

It will be appreciated from the foregoing that the arrangement described provides secure mounting of the spectacles as well as automatic positioning of the adjusting members. Because of the flexibility of the holder it can be utilized by anyone. It is noted that spectacles of any standard type can be used and that it is possible to use the holder of the present invention with other devices having bows or arms. The arched frame 1 can rest behind the back part of the head rather than on top thereof as indicated in FIGURE 1. Further, pins 3 may be of any convenient shape and may be arranged such that they perform merely as stops for limiting the upward movement of adjusting members 4 rather than additionally as gripping projections although an arrangement where they perform both as limit stops and gripping members is preferred. Springs 12 may be omitted but at the cost of the increased manipulation required for adjusting the position of the adjusting members 4.

Having thus described my invention in accordance with the patent statutes,

We claim:

1. An adjustable supporting device for spectacles or like objects comprising arched frame means for fitting over the head of a user, first and second elongated members affixed to and depending from said arched frame means, first and second adjusting members mounted on said first and second elongate members, each of said adjusting members including a bore hole therethrough for receiving an associated elongate member therein, the diameter of said bore hole being greater than the diameter of said elongated member such that there is play therebetween and pivoting of said adjusting member relative to said rod member causing locking therebetween, spring clamp means mounted on said adjusting members for gripping a portion of the object to be supported, and resilient means for causing relative displacement between said adjusting members and said arched frame means whereby said frame means engages the head of a user.

2. An adjustable supporting device as claimed in claim 1 wherein said resilient means comprises first and second spring means respectively mounted on said first and second elongate members in surrounding relationship therewith, and first and second end stops respectively mounted on the ends of said elongate members, each of said spring means being compressed between a corresponding adjusting member and end stop upon relative movement of said adjusting member and said end stop toward one another.

3. An adjustable supporting device as claimed in claim 2 wherein each of said end stops comprises a hollow cylinder closed at one end, each of said cylinders being of such a length as to completley house a corresponding spring means when said spring means is in the fully compressed state thereof.

4. An adjustable supporting device as claimed in claim 1 further comprising pin means located at the junctions between said frame means and said elongate members.

5. An adjustable supporting device as claimed in claim 4 wherein said pin means extend outwardly of said frame means and said elongate members to form means for permitting gripping the supporting device with the fingers.

6. An adjustable supporting device as claimed in claim 1 wherein at least a portion of each of said adjusting members extends outwardly of said elongate members to form means for permitting gripping the supporting device with the fingers.

7. An adjustable supporting device as claimed in claim 1 wherein the gripping surfaces of said clamp means are rounded.

References Cited

UNITED STATES PATENTS

| | | | |
|---|---|---|---|
| 2,541,493 | 2/1951 | Barroso | 351—156 |
| 2,968,076 | 1/1961 | Chanko | 351—157 |

FOREIGN PATENTS

| | | |
|---|---|---|
| 986,716 | 4/1951 | France. |

DAVID SCHONBERG, Primary Examiner

R. L. SHERMAN, Assistant Examiner